US012598537B2

(12) United States Patent
Xu et al.

(10) Patent No.: US 12,598,537 B2
(45) Date of Patent: Apr. 7, 2026

(54) METHODS FOR CELL ACCESS AND DEVICES

(71) Applicant: GUANGDONG OPPO MOBILE TELECOMMUNICATIONS CORP., LTD., Dongguan (CN)

(72) Inventors: Weijie Xu, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 327 days.

(21) Appl. No.: 17/541,204

(22) Filed: Dec. 2, 2021

(65) Prior Publication Data

US 2022/0095201 A1      Mar. 24, 2022

Related U.S. Application Data

(63) Continuation of application No. PCT/CN2019/092855, filed on Jun. 25, 2019.

(51) Int. Cl.
| | |
|---|---|
| *H04W 48/02* | (2009.01) |
| *H04W 48/16* | (2009.01) |
| *H04W 72/23* | (2023.01) |
| *H04W 76/18* | (2018.01) |

(52) U.S. Cl.
CPC ........... *H04W 48/02* (2013.01); *H04W 48/16* (2013.01); *H04W 72/23* (2023.01); *H04W 76/18* (2018.02)

(58) Field of Classification Search
CPC ..... H04W 48/02; H04W 48/16; H04W 72/23; H04W 76/18; H04W 12/08; H04W 36/08; H04W 36/0085; H04W 24/02
See application file for complete search history.

(56) References Cited

U.S. PATENT DOCUMENTS

| | | | |
|---|---|---|---|
| 2011/0235558 A1 | 9/2011 | Diachina et al. | |
| 2017/0311285 A1* | 10/2017 | Ly | H04W 72/30 |
| 2018/0048444 A1* | 2/2018 | Park | H04L 27/2613 |
| 2018/0176067 A1* | 6/2018 | Luo | H04W 56/00 |
| 2018/0183938 A1 | 6/2018 | Cai et al. | |
| 2019/0045577 A1 | 2/2019 | Kim et al. | |
| 2019/0053061 A1* | 2/2019 | Sui | H04W 72/0446 |
| 2019/0109699 A1* | 4/2019 | Liu | H04L 27/261 |

(Continued)

FOREIGN PATENT DOCUMENTS

| | | |
|---|---|---|
| CN | 102149219 | 8/2011 |
| CN | 102812755 | 12/2012 |

(Continued)

OTHER PUBLICATIONS

WIPO, International Search Report for PCT/CN2019/092855, Mar. 19, 2020.

(Continued)

*Primary Examiner* — Atique Ahmed
(74) *Attorney, Agent, or Firm* — Hodgson Russ LLP

(57) ABSTRACT

Methods for cell access and devices are provided, which can efficiently control cell access of an internet of things (IoT)-type device. A method includes the following. A terminal device obtains first indication information. The terminal device determines, according to the first indication information, whether the terminal device is allowed to access a cell, where the terminal device is an IoT-type device.

9 Claims, 5 Drawing Sheets

(56)     References Cited

U.S. PATENT DOCUMENTS

| 2019/0141609 A1* | 5/2019 | Kim | H04W 4/70 |
| 2019/0222367 A1* | 7/2019 | Tseng | H04W 36/0069 |
| 2020/0053602 A1* | 2/2020 | Kadiri | H04W 4/80 |
| 2020/0067690 A1* | 2/2020 | Park | H04W 72/0453 |
| 2020/0162981 A1* | 5/2020 | Jain | H04W 36/302 |
| 2020/0213193 A1* | 7/2020 | Newell | H04W 4/70 |
| 2020/0252858 A1* | 8/2020 | Wang | H04W 48/08 |
| 2021/0045146 A1* | 2/2021 | Beale | H04W 72/23 |
| 2021/0126869 A1* | 4/2021 | Qureshi | H04L 43/10 |

FOREIGN PATENT DOCUMENTS

| CN | 103748942 | | 4/2014 | |
| WO | WO-2017078140 A1 | * | 5/2017 | H04W 76/10 |
| WO | 2018127505 A1 | | 7/2018 | |
| WO | 2019030429 A1 | | 2/2019 | |

OTHER PUBLICATIONS

EPO, Extended European Search Report for EP 19934474.8, Apr. 12, 2022.

* cited by examiner

300

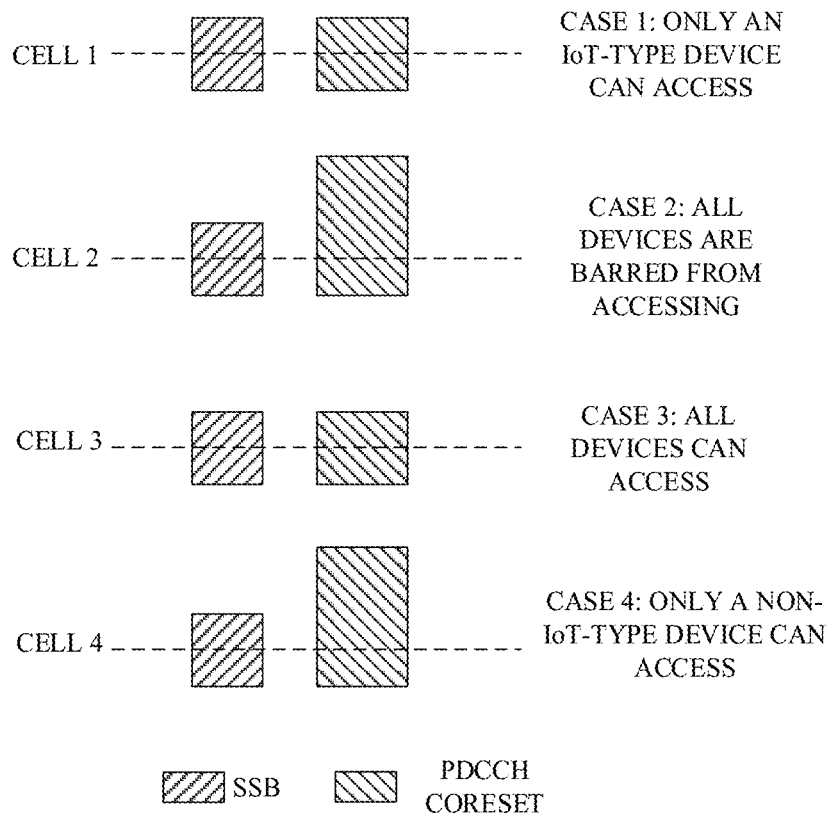

CELL 1 — CASE 1: ONLY AN IoT-TYPE DEVICE CAN ACCESS

CELL 2 — CASE 2: ALL DEVICES ARE BARRED FROM ACCESSING

CELL 3 — CASE 3: ALL DEVICES CAN ACCESS

CELL 4 — CASE 4: ONLY A NON-IoT-TYPE DEVICE CAN ACCESS

SSB        PDCCH CORESET

FIG. 4

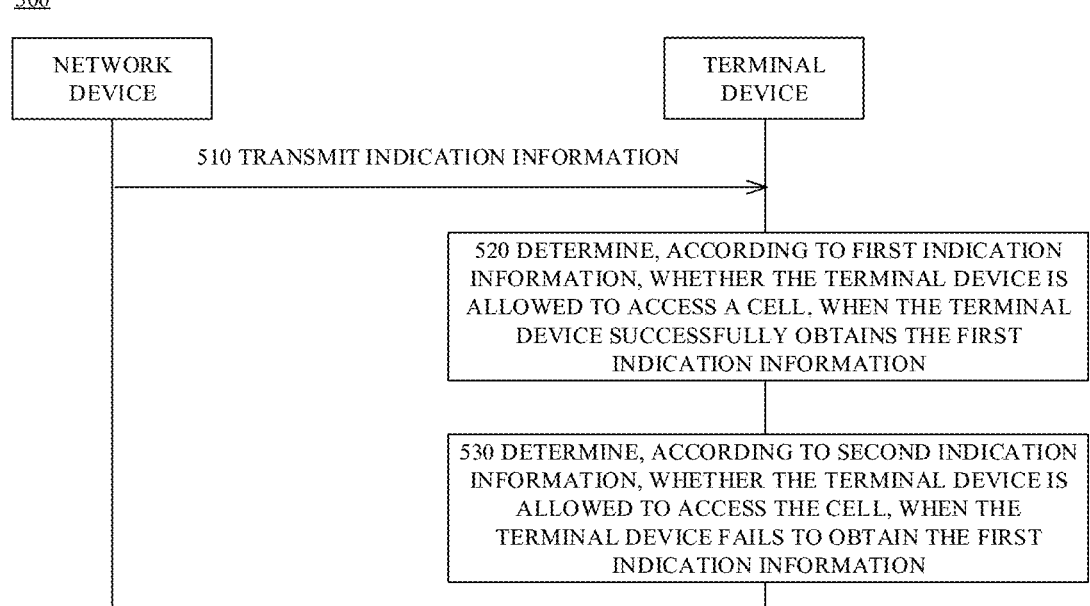

500

NETWORK DEVICE

TERMINAL DEVICE

510 TRANSMIT INDICATION INFORMATION

520 DETERMINE, ACCORDING TO FIRST INDICATION INFORMATION, WHETHER THE TERMINAL DEVICE IS ALLOWED TO ACCESS A CELL, WHEN THE TERMINAL DEVICE SUCCESSFULLY OBTAINS THE FIRST INDICATION INFORMATION

530 DETERMINE, ACCORDING TO SECOND INDICATION INFORMATION, WHETHER THE TERMINAL DEVICE IS ALLOWED TO ACCESS THE CELL, WHEN THE TERMINAL DEVICE FAILS TO OBTAIN THE FIRST INDICATION INFORMATION

FIG. 5

METHODS FOR CELL ACCESS AND DEVICES

CROSS REFERENCE TO RELATED APPLICATION(S)

This application is a continuation of International Application No. PCT/CN2019/092855, filed on Jun. 25, 2019, the entire disclosure of which is incorporated herein by reference.

TECHNICAL FIELD

This disclosure relates to the field of communication, and more particularly to methods for cell access and devices.

RELATED ART

With continuous evolution and assistance of wireless communication technology, machine type communication (MTC) devices, evolved MTC (eMTC) devices, and internet of things (IoT) devices have achieved rapid development. Such devices are used to support some applications with low data rate and high transmission delay, and have played an important role in smart homes, smart cities, smart factories, remote detection, smart transportation, etc. When such a device, together with other devices such as a terminal with high data rate and low transmission delay, is located in the same cell, how to efficiently control cell access of such a device has become a problem to be solved.

SUMMARY

In a first aspect, a method for cell access is provided. The method includes the following. A terminal device obtains first indication information. The terminal device determines, according to the first indication information, whether the terminal device is allowed to access a cell, where the terminal device is an IoT-type device.

In a second aspect, a method for cell access is provided. The method includes at least one of the following. When a terminal device obtains first indication information, the terminal device determines, according to the first indication information, whether the terminal device is allowed to access a cell, where the terminal device is an IoT-type device. When the terminal device fails to obtain the first indication information, the terminal device determines, according to second indication information, whether the terminal device is allowed to access the cell, where the second indication information is further indicative of whether a non-IoT-type device is allowed to access the cell.

In a third aspect, a method for cell access is provided. The method includes the following. A network device transmits first indication information, where the first indication information is indicative of whether an IoT-type device is allowed to access a cell.

In a fourth aspect, a method for cell access is provided. The method includes the following. A network device transmits indication information. The indication information includes first indication information and second indication information, where the first indication information is indicative of whether an IoT-type device is allowed to access a cell, and the second indication information is indicative of whether a non-IoT-type device is allowed to access the cell. Alternatively, the indication information includes the second indication information without including the first indication information, where the second indication information is further indicative of whether an IoT-type device is allowed to access the cell.

In a fifth aspect, a terminal device is provided. The terminal device is configured to perform the method described in the first aspect or in any other implementation of the first aspect. The terminal device includes functional modules for performing the method described in the first aspect or in any other implementation of the first aspect.

In a sixth aspect, a terminal device is provided. The terminal device is configured to perform the method described in the second aspect or in any other implementation of the second aspect. The terminal device includes functional modules for performing the method described in the second aspect or in any other implementation of the second aspect.

In a seventh aspect, a network device is provided. The network device is configured to perform the method described in the third aspect or in any other implementation of the third aspect. The network device includes functional modules for performing the method described in the third aspect or in any other implementation of the third aspect.

In an eighth aspect, a network device is provided. The network device is configured to perform the method described in the fourth aspect or in any other implementation of the fourth aspect. The network device includes functional modules for performing the method described in the fourth aspect or in any other implementation of the fourth aspect.

In a ninth aspect, a terminal device is provided. The terminal device includes a processor and a memory. The memory is configured to store computer programs. The processor is configured to invoke and execute the computer programs stored in the memory, to perform the method described in the first aspect or in any other implementation of the first aspect.

In a tenth aspect, a terminal device is provided. The terminal device includes a processor and a memory. The memory is configured to store computer programs. The processor is configured to invoke and execute the computer programs stored in the memory, to perform the method described in the second aspect or in any other implementation of the second aspect.

In an eleventh aspect, a network device is provided. The network device includes a processor and a memory. The memory is configured to store computer programs. The processor is configured to invoke and execute the computer programs stored in the memory, to perform the method described in the third aspect or in any other implementation of the third aspect.

In a twelfth aspect, a network device is provided. The network device includes a processor and a memory. The memory is configured to store computer programs. The processor is configured to invoke and execute the computer programs stored in the memory, to perform the method described in the fourth aspect or in any other implementation of the fourth aspect.

In a thirteenth aspect, a communication apparatus is provided. The communication apparatus includes a processor. The processor is configured to invoke and execute computer programs stored in a memory, to cause a device equipped with the communication apparatus to perform the method described in the first aspect or in any other implementation of the first aspect. The communication apparatus may be, for example, a chip.

In a fourteenth aspect, a communication apparatus is provided. The communication apparatus includes a processor. The processor is configured to invoke and execute computer programs stored in a memory, to cause a device equipped with the communication apparatus to perform the method described in the second aspect or in any other implementation of the second aspect. The communication apparatus may be, for example, a chip.

In a fifteenth aspect, a communication apparatus is provided. The communication apparatus includes a processor. The processor is configured to invoke and execute computer programs stored in a memory, to cause a device equipped with the communication apparatus to perform the method described in the third aspect or in any other implementation of the third aspect. The communication apparatus may be, for example, a chip.

In a sixteenth aspect, a communication apparatus is provided. The communication apparatus includes a processor. The processor is configured to invoke and execute computer programs stored in a memory, to cause a device equipped with the communication apparatus to perform the method described in the fourth aspect or in any other implementation of the fourth aspect. The communication apparatus may be, for example, a chip.

In a seventeenth aspect, a computer readable storage medium is provided. The computer readable storage medium is configured to store computer programs which are operable with a computer to perform the method described in the first aspect or in any other implementation of the first aspect.

In an eighteenth aspect, a computer readable storage medium is provided. The computer readable storage medium is configured to store computer programs which are operable with a computer to perform the method described in the second aspect or in any other implementation of the second aspect.

In a nineteenth aspect, a computer readable storage medium is provided. The computer readable storage medium is configured to store computer programs which are operable with a computer to perform the method described in the third aspect or in any other implementation of the third aspect.

In a twentieth aspect, a computer readable storage medium is provided. The computer readable storage medium is configured to store computer programs which are operable with a computer to perform the method described in the fourth aspect or in any other implementation of the fourth aspect.

In a twenty-first aspect, a computer program product is provided. The computer program product includes computer program instructions which are operable with a computer to perform the method described in the first aspect or in any other implementation of the first aspect.

In a twenty-second aspect, a computer program product is provided. The computer program product includes computer program instructions which are operable with a computer to perform the method described in the second aspect or in any other implementation of the second aspect.

In a twenty-third aspect, a computer program product is provided. The computer program product includes computer program instructions which are operable with a computer to perform the method described in the third aspect or in any other implementation of the third aspect.

In a twenty-fourth aspect, a computer program product is provided. The computer program product includes computer program instructions which are operable with a computer to perform the method described in the fourth aspect or in any other implementation of the fourth aspect.

In a twenty-fifth aspect, a computer program is provided. The computer program, when executed by a computer, is operable with the computer to perform the method described in the first aspect or in any other implementation of the first aspect.

In a twenty-sixth aspect, a computer program is provided. The computer program, when executed by a computer, is operable with the computer to perform the method described in the second aspect or in any other implementation of the second aspect.

In a twenty-seventh aspect, a computer program is provided. The computer program, when executed by a computer, is operable with the computer to perform the method described in the third aspect or in any other implementation of the third aspect.

In a twenty-eighth aspect, a computer program is provided. The computer program, when executed by a computer, is operable with the computer to perform the method described in the fourth aspect or in any other implementation of the fourth aspect.

In a twenty-ninth aspect, a communication system is provided. The communication system includes a terminal device and a network device, where the terminal device is an IoT-type device. The network device is configured to transmit first indication information, where the first indication information is indicative of whether the IoT-type device is allowed to access a cell. The terminal device is configured to obtain the first indication information, and determine, according to the first indication information, whether the terminal device is allowed to access the cell.

In a thirtieth aspect, a communication system is provided. The communication system includes a terminal device and a network device, where the terminal device is an IoT-type device. The network device is configured to transmit indication information. The indication information includes first indication information and second indication information, where the first indication information is indicative of whether the IoT-type device is allowed to access a cell, and the second indication information is indicative of whether a non-IoT-type device is allowed to access the cell. Alternatively, the indication information includes the second indication information without including the first indication information, where the second indication information is further indicative of whether the IoT-type device is allowed to access the cell. The terminal device is configured to perform at least one of the following. The terminal device is configured to determine, according to the first indication information, whether the terminal device is allowed to access the cell, when the terminal device obtains the first indication information. The terminal device is configured to determine, according to the second indication information, whether the terminal device is allowed to access the cell, when the terminal device fails to obtain the first indication information.

BRIEF DESCRIPTION OF THE DRAWINGS

FIG. 4 is a schematic diagram of possible PDCCH CORESET bandwidths in different cases shown in Table 1.

FIG. 5 is an interaction flowchart of a method for cell access according to other implementations.

DETAILED DESCRIPTION

The following will describe technical solutions of implementations with reference to the accompanying drawings.

The technical solutions of implementations are applicable to various communication systems, for example, a global system of mobile communication (GSM), a code division multiple access (CDMA) system, a wideband code division multiple access (WCDMA) system, a long term evolution (LTE) system, an LTE frequency division duplex (LTE-FDD) system, an LTE time division duplex (LTE-TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a $5^{th}$ generation (5G) system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations herein can also be applied to these communication systems.

A communication system of implementations may be applied to a carrier aggregation (CA) scenario, a dual connectivity (DC) scenario, or a standalone (SA) network deployment scenario.

Figure 1:
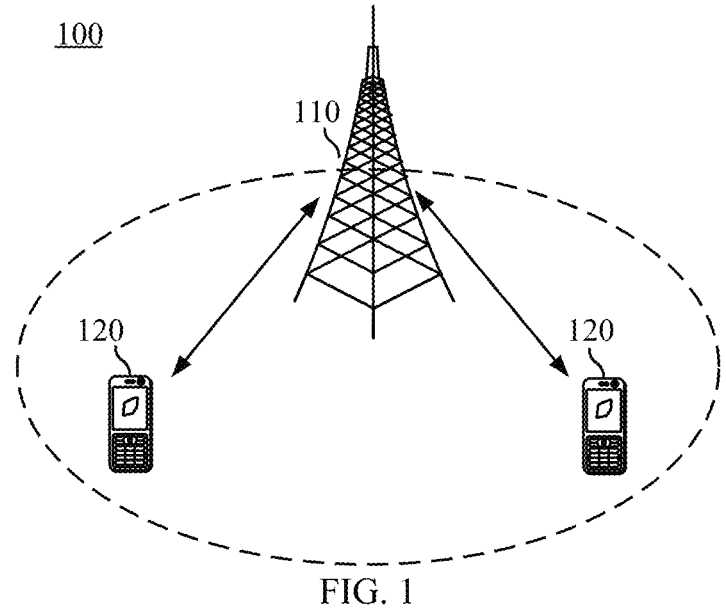
FIG. 1 is a schematic diagram of a wireless communication system according to implementations.

FIG. 1 illustrates a communication system 100 of implementations. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area.

The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The terminal device 120 may be mobile or fixed. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device. The terminal device may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, and a terminal device in a future evolved PLMN, etc., which is not limited herein. As an example, terminal devices 120 can communicate with each other through D2D communication.

The network device 110 provides services for a cell, and the terminal device 120 communicates with the network device 110 through a transmission resource (for example, a frequency domain resource or a spectrum resource) for the cell. The cell may be a cell corresponding to the network device 110. The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

FIG. 1 exemplarily illustrates one network device and two terminal devices, but the disclosure is not limited in this regard. The wireless communication system 100 may also include multiple network devices, and there can be other numbers of terminal devices in a coverage area of each of the network devices. In addition, the wireless communication system 100 may further include other network entities such as a network controller, a mobile management entity, or the like.

With continuous evolution and assistance of wireless communication technology, internet of things (IoT) technology is developing rapidly. MTC/evolved MTC (eMTC) and IoT series standards have become candidate technical standards for 5G massive MTC technology. These technical standards are expected to play an important role in various aspects of people's life, such as smart homes, smart cities, smart factories, remote monitoring, and smart transportation.

An MTC/eMTC device, an IoT device, and the like have advantages such as low cost, low price, support for ultra-low power consumption, and support for deep, extensive and large coverage scenarios, which are conducive to rapid popularization of IoT technology in an early stage of development. However, these devices have some limitations in terms of application scenarios. Since design of the MTC/eMTC device or the IoT device aims to support some applications with low data rate and high transmission delay, the MTC/eMTC device and the IoT device are not applicable to some IoT scenarios that require relatively high rate (such as video monitoring in smart security) and industrial applications that require relatively low delay. However, if a terminal device with high transmission rate and low transmission delay is adopted, it will far exceed actual requirements of these scenarios and thus increase unnecessary costs. To this end, an IoT-type device, which supports medium transmission rate, medium delay requirement, and medium and small bandwidth size, is proposed. For example, it can support a 10 MHz (megahertz) bandwidth and a 100 Mbps (megabits per second) transmission rate.

Besides the terminal device 120, the communication system illustrated in FIG. 1 may further include the IoT-type device mentioned above. Implementations herein involve two types of terminal devices, namely the IoT-type device (also referred to as the IoT device) and a non-IoT-type device (also referred to as a non-IoT device). The IoT-type device may be, for example, the MTC device or the IoT device. The non-IoT-type device may include, for example, an enhanced mobile broadband (eMBB) device and an ultra-reliable low latency communication (URLLC) device.

In NR, compared with the non-IoT-type device such as the eMBB device and the URLLC device, the IoT-type device of implementations can have one or more of the following characteristics: 1) narrow bandwidth, 2) few antennas, 3) support for low data transmission rate, 4) low maximum transmission power, 4) tolerance on high delay.

When accessing a cell, the terminal device needs to detect a synchronization signal/physical broadcast channel (PBCH) block (SS/PBCH block, SS block, or SSB). The SSB may include, for example, a primary synchronization signal (PSS), a secondary synchronization signal (SSS), and a PBCH.

The PBCH can be indicative of configuration information of a physical downlink control channel (PDCCH) control resource set (CORESET). The IoT-type device can obtain, from the PDCCH CORESET, remaining minimum system information (RMSI). When a 15 kHz (kilohertz) subcarrier spacing (SCS) is adopted, the PDCCH CORESET may be configured as 24, 48, or 96 physical resource blocks (PRB).

Figure 2:
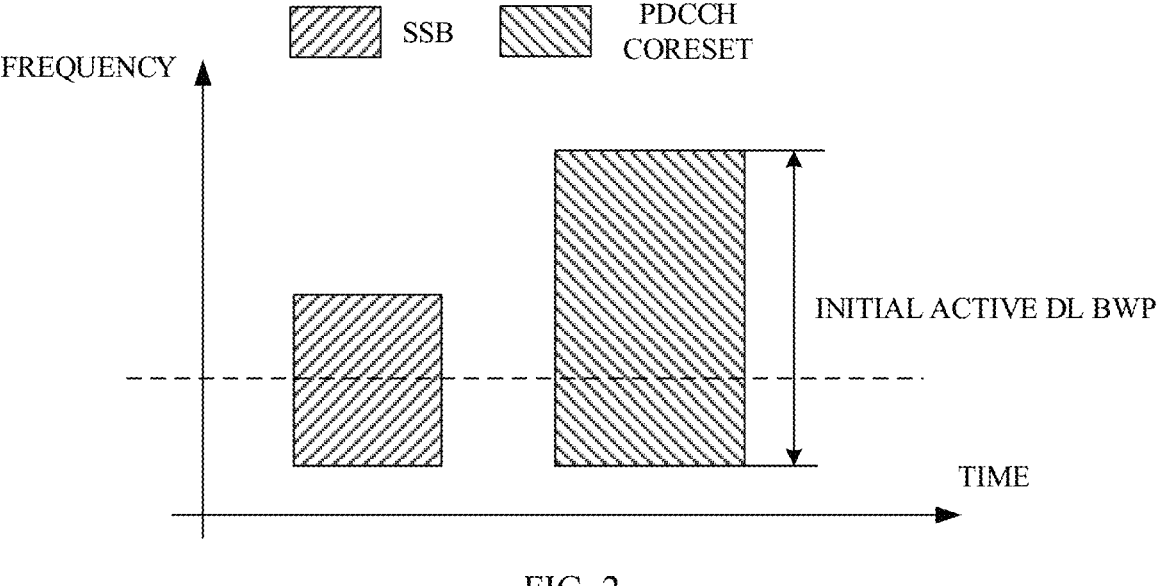
FIG. 2 is a schematic diagram of a physical downlink control channel (PDCCH) control resource set (CORESET).

As illustrated in FIG. 2, an SCS, a size of an occupied bandwidth, and a frequency band location of an initial active downlink (DL) bandwidth part (BWP) in NR are consistent with those of the above PDCCH CORESET. A system message required for initial access of the terminal device is required to be transmitted in the BWP. The system message can be RMSI, a system information block (SIB), a paging message, a random access response (RAR) message, or the like.

Supposing that the SCS is 15 kHz, a bandwidth of the above PDCCH CORESET ("PDCCH CORESET bandwidth" for short) is configured as 96 PRBs. If a bandwidth supported by the IoT-type device is 10 MHz, the bandwidth of the PDCCH CORESET is applicable only to the non-IoT-type device, and on the other hand, the IoT-type device cannot read RMSI and other information transmitted by the network device due to limitation of bandwidth. If the network device takes the IoT-type device into consideration when configuring a PDCCH CORESET bandwidth, it will adversely affect initial access and data transmission of the non-IoT-type device.

To this end, implementations provide a cell-access control method, which can separately control cell access of the IoT-type device and cell access of the non-IoT-type device, thereby avoiding the IoT-type device and the non-IoT-type device from affecting each other in cell access.

Figure 3:
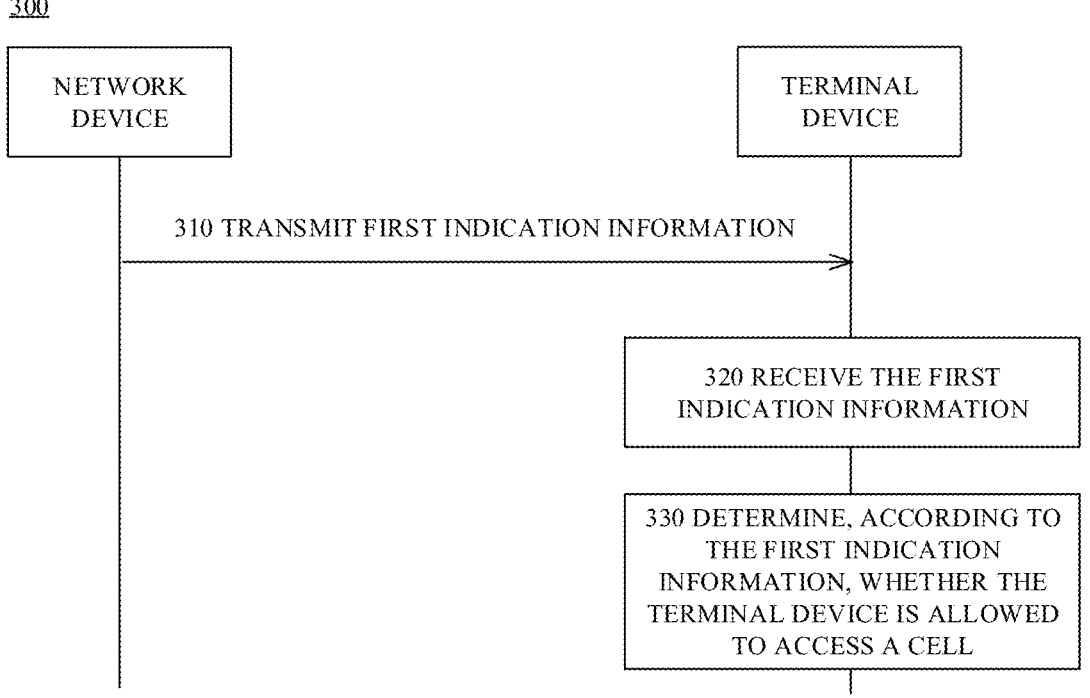
FIG. 3 is an interaction flowchart of a method for cell access according to implementations.

FIG. 3 is an interaction flowchart of a method for cell access according to implementations. The method can be performed by a terminal device and a network device. The method 300 illustrated in FIG. 3 includes some or all of the following operations.

At block 310, the network device transmits first indication information.

The first indication information is indicative of whether an IoT-type device is allowed to access a cell.

At block 320, the terminal device obtains the first indication information.

At block 330, the terminal device determines, according to the first indication information, whether the terminal device is allowed to access the cell.

The terminal device is the IoT-type device and can support IoT communication.

The terminal device determines, according to the first indication information transmitted by the network device, whether the terminal device is allowed to access the cell. The terminal device can access the cell only when allowed to access the cell; otherwise, the terminal device cannot access the cell.

In some implementations, the first indication information is carried in an MIB, or carried in an SIB, for example, SIB 1 or RMSI.

When the first indication information is carried in the MIB for transmission, the IoT-type device can determine whether it is allowed to access the cell after reading a PBCH, without reading an SIB, which is possible to save power of the device and reduce access delay. However, in the above manner, bits in the PBCH will be occupied, for example, a reserved bit or a spare bit in the PBCH may be used, or bits for other uses in the MIB may be reused.

In some implementations, the first indication information occupies 1 bit, and a value of the bit is indicative of whether the IoT-type device is allowed to access the cell. For example, if the value of the bit is 1, it indicates that the IoT-type device is allowed to access the cell; and if the value of the bit is 0, it indicates that the IoT-type device is not allowed to access the cell. Alternatively, if the value of the bit is 0, it indicates that the IoT-type device is allowed to access the cell; and if the value of the bit is 1, it indicates that the IoT-type device is not allowed to access the cell.

The method may further include the following. The network device transmits second indication information, where the second indication information is indicative of whether a non-IoT-type device is allowed to access the cell.

The second indication information may be, for example, a "cellBarred" field in the MIB. If the value of the field represents "barred", the non-IoT-type device is not allowed to access the cell; and if the value of the field represents "not barred", the non-IoT-type device is allowed to access the cell.

In some implementations, the first indication information and the second indication information can be carried in the same information block or carried in different information blocks. For example, the first indication information is carried in the SIB, and the second indication information is carried in the MIB. Alternatively, the first indication information and the second indication information are both carried in the MIB.

As such, the network device can indicate, through the first indication information, whether the IoT-type device is allowed to access the cell, and indicate, through the second indication information, whether the non-IoT-type device is allowed to access the cell, which is possible to avoid the IoT-type device and the non-IoT-type device from affecting each other in initial access.

As an example, table 1 describes access control on the IoT-type device and the non-IoT-type device in different cases.

TABLE 1

| | Second indication information (cellBarred) | First indication information | Non-IoT-type device | IoT-type device |
|---|---|---|---|---|
| Case 1 | Barred | Allowed | Access not allowed | Access allowed |
| Case 2 | Barred | Not allowed | Access not allowed | Access not allowed |
| Case 3 | Not barred | Allowed | Access allowed | Access allowed |
| Case 4 | Not barred | Not allowed | Access allowed | Access not allowed |

As shown in table 1, in case 1, a value of the second indication information (cellBarred) represents "barred", and a value of the first indication information represents "allowed". Therefore, the non-IoT-type device cannot access the cell, and the IoT-type device can access the cell. In case 2, the value of the second indication information represents "barred", and the value of the first indication information represents "not allowed". Therefore, the non-IoT-type device cannot access the cell, and the IoT-type device also cannot access the cell. In case 3, the value of the second indication information represents "not barred", and the value of the first indication information represents "allowed". Therefore, the non-IoT-type device can access the cell, and the IoT-type device can also access the cell. In case 4, the value of the second indication information represents "not barred", and the value of the first indication information represents "not allowed". Therefore, the non-IoT-type device can access the cell, and the IoT-type device cannot access the cell.

In case 1 and case 3 described above, the IoT-type device can access the cell.

For example, in case 1, a cell intended for the IoT-type device may have been deployed. Since a dedicated cell has been designed for the IoT-type device, the cell is adapted to narrow bandwidth of the IoT-type device. The network device can adopt, for example, a 10 MHz bandwidth frequency, to transmit RMSI, an SIB, a paging message, etc. In addition, in order to ensure that initial access of the IoT-type device is not affected by other devices, the network device further indicates, through the second indication information, that the non-IoT-type device (such as an eMBB device and a URLLC device) is barred from accessing the dedicated cell.

For another example, in case 3, the cell is configured with a narrow initial active DL BWP, such as a bandwidth of 24 PRBs. As such, both the non-IoT-type device and the IoT-type device in the cell can access the cell. In other words, the cell is common to the IoT-type device and the non-IoT-type device, and can serve all types of devices.

Transmission of a public message, such as an SIB, a paging message, and the like, may be different in the above two cases. In case 1, the network device only requires the IoT-type device to access the cell. Since a system only serves the IoT-type device, an SIB in the cell only needs to include broadcast information associated with the IoT-type device. In case 3, the cell can serve both the IoT-type device and the non-IoT-type device. Therefore, an SIB in the cell needs to include not only broadcast information associated with the IoT-type device but also broadcast information associated with the non-IoT-type device.

In case 2, for example, a current load of a network is excessively high, or the cell is at commissioning, or the cell is under test, and therefore, the network device does not expect any terminal access. Thus, the network device indicates, through the second indication information, that the non-IoT-type device is barred from accessing, and indicates, through the first indication information, that the IoT-type device is not allowed to access.

In case 4, the cell is an NR ordinary cell. The network device may not expect to be limited by a bandwidth of the IoT-type device, or not expect that access and data transmission of other types of devices are affected by the IoT-type device. Therefore, a PDCCH CORESET bandwidth adapted to the non-IoT-type device (such as 96 PRBs) can be deployed in the cell, and as such, the network device indicates, through the first indication information, that the IoT-type device is not allowed to access.

FIG. 4 illustrates possible PDCCH CORESET bandwidths in the above four cases. In case 1 and case 3, the IoT-type device is allowed to access the cell. Therefore, a PDCCH CORESET bandwidth is small, which matches a bandwidth that can be supported by the IoT-type device.

FIG. 5 is an interaction flowchart of a method for cell access according to other implementations. The method can be performed by a terminal device and a network device. The method 500 illustrated in FIG. 5 includes some of the following operations.

At block 510, the network device transmits indication information.

The indication information may include first indication information and second indication information, where the first indication information is indicative of whether an IoT-type device is allowed to access a cell, and the second indication information is indicative of whether a non-IoT-type device is allowed to access the cell.

Alternatively, the indication information may include the second indication information without including the first indication information. In this scenario, the second indication information is further indicative of whether the IoT-type device is allowed to access the cell.

If the terminal device successfully obtains the first indication information, the terminal device performs operations at block 520. If the terminal device fails to obtain the first indication information, the terminal device performs operations at block 530.

At block 520, the terminal device determines, according to the first indication information, whether the terminal device is allowed to access the cell.

At block 530, the terminal device determines, according to the second indication information, whether the terminal device is allowed to access the cell.

The terminal device is the IoT-type device.

The network device can selectively transmit the first indication information. If the terminal device successfully obtains the first indication information, the terminal device determines, according to the first indication information, whether the terminal device is allowed to access the cell. If the terminal device fails to obtain the first indication information, the terminal device determines, according to the second indication information, whether the terminal device is allowed to access the cell. In this scenario, the second indication information is not only indicative of whether the non-IoT-type device is allowed to access the cell, but also indicative of whether the IoT-type device is allowed to access the cell.

The first indication information is carried in an MIB, or carried in an SIB, for example, SIB 1 or RMSI.

When the first indication information is carried in the MIB for transmission, the IoT-type device can determine whether it is allowed to access the cell after reading a PBCH, without reading an SIB, which is possible to save power of the device and reduce access delay. However, in the above manner, bits in the PBCH will be occupied, for example, a reserved bit or a spare bit in the PBCH may be used, or bits for other uses in the MIB may be reused.

In some implementations, the first indication information occupies 1 bit, and a value of the bit is indicative of whether the IoT-type device is allowed to access the cell. For example, if the value of the bit is 1, it indicates that the IoT-type device is allowed to access the cell; and if the value of the bit is 0, it indicates that the IoT-type device is not allowed to access the cell. Alternatively, if the value of the bit is 0, it indicates that the IoT-type device is allowed to access the cell; and if the value of the bit is 1, it indicates that the IoT-type device is not allowed to access the cell.

The second indication information may be, for example, a "cellBarred" field in the MIB. If the value of the field represents "barred", the non-IoT-type device is not allowed to access the cell; and if the value of the field represents "not barred", the non-IoT-type device is allowed to access the cell.

When the network device transmits both the first indication information and the second indication information, the first indication information and the second indication information can be carried in the same information block or carried in different information blocks. For example, the first indication information is carried in the SIB, and the second indication information is carried in the MIB. Alternatively, the first indication information and the second indication information are both carried in the MIB.

The network device can determine, according to specific scenarios, whether both the first indication information and the second indication information or only the second indication information is transmitted to the terminal device. For example, if a PDCCH CORESET bandwidth in a system is narrow, for example, 24 PRBs or 48 PRBs, the IoT-type device can read RMSI and access the cell. In this scenario, the RMSI is shared by the IoT-type device and the non-IoT-type device. Therefore, the network device can control, through the second indication information, both the IoT-type device and non-IoT-type device in terms of cell access. For another example, if the PDCCH CORESET bandwidth exceeds a bandwidth that can be supported by the IoT-type device, or the network device does not expect the IoT-type device and the non-IoT-type device to access the same cell, the network device indicates, through the first indication information, whether the IoT-type device is allowed to access the cell, and indicates, through the second indication information, whether the non-IoT-type device is allowed to access the cell, thereby avoiding the IoT-type device and the non-IoT-type device from affecting each other in initial access.

As an example, table 2 describes access control on the IoT-type device and the non-IoT-type device in different cases.

TABLE 2

| | Second indication information | First indication information | Non-IoT-type device | IoT-type device |
|---|---|---|---|---|
| Case 1 | Barred | No presence | Access not allowed | Access not allowed |
| Case 2 | Not barred | No presence | Access allowed | Access allowed |
| Case 3 | Barred | Presence and allowed | Access not allowed | Access allowed |
| Case 4 | Not barred | Presence and not allowed | Access allowed | Access not allowed |

As shown in table 2, in case 1, a value of the second indication information (cellBarred) represents "barred", and therefore, neither the non-IoT-type device nor the IoT-type device is allowed to access the cell. In case 2, the value of the second indication information represents "not barred", and therefore, the non-IoT-type device and the IoT-type device are both allowed to access the cell. In case 3, the value of the second indication information represents "barred", and a value of the first indication information represents "allowed". Therefore, the non-IoT-type device cannot access the cell, and the IoT-type device can access the cell. In case 4, the value of the second indication information represents "not barred", and the value of the first indication information represents "not allowed". Therefore, the non-IoT-type device can access the cell, and the IoT-type device cannot access the cell.

No matter whether the method illustrated in FIG. 3 or the method illustrated in FIG. 5 is adopted for access control on the IoT-type device, for cell deployment in different scenarios, the network device can flexibly control cell access of the IoT-type device and cell access of the non-IoT-type device, thereby avoiding the IoT-type device and the non-IoT-type device from affecting each other. On the other hand, it is possible for an NR ordinary cell to be exempt from limitation of a bandwidth of the IoT-type device.

In addition, since the second indication information of implementations may be implemented by some parameters in an existing MIB, for example, a "cellBarred" field. In this way, it is only necessary to change behavior of the IoT-type device, which results in only a minor modification of a standard.

Various implementations described herein and/or technical features in the various implementations can be combined with each other in any proper manner without conflict, and the technical solutions thus obtained shall also fall within the protection scope of the disclosure.

In various implementations herein, the size of the sequence number of each process described above does not mean the order of execution, and the execution order of each process should be determined by its function and internal logic, which shall not constitute any limitation on the implementation process of implementations.

The methods for cell access of implementations have been described in detail above. The following will describe devices of implementations with reference to FIG. 6 to FIG. 13. Technical features described in the method implementations are applicable to the following device/apparatus implementations.

Figure 6:
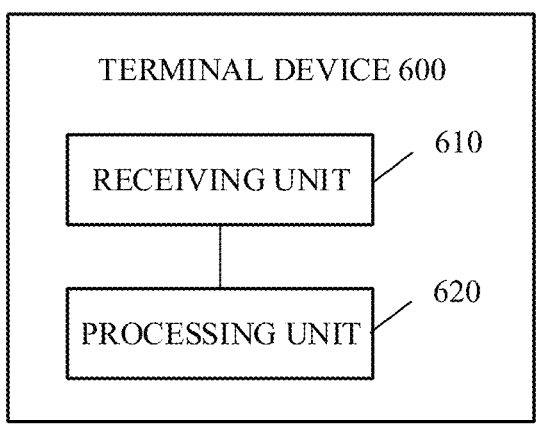
FIG. 6 is a schematic block diagram of a terminal device according to implementations.

FIG. 6 is a schematic block diagram of a terminal device 600 according to implementations. As illustrated in FIG. 6, the terminal device 600 includes a receiving unit 610 and a processing unit 620. The receiving unit 610 is configured to receive first indication information. The processing unit 620 is configured to determine, according to the first indication information received by the receiving unit 610, whether the terminal device is allowed to access a cell, where the terminal device is an IoT-type device.

Therefore, a network device indicates, through indication information transmitted, whether the IoT-type device is allowed to access the cell. The terminal device determines, according to the indication information received from the network device, whether the terminal device can access the cell, which is possible to achieve efficient control of cell access of the IoT-type device, thereby avoiding the IoT-type device and a non-IoT-type device from affecting each other.

In some implementations, the first indication information and second indication information are carried in the same information block or carried in different information blocks, where the second indication information is indicative of whether the non-IoT-type device is allowed to access the cell.

In some implementations, the first indication information is carried in an MIB or an SIB.

In some implementations, the first indication information occupies 1 bit, and a value of the bit is indicative of whether the IoT-type device is allowed to access the cell.

It should be understood that, the terminal device 600 can implement the operations performed by the terminal device in the method illustrated in FIG. 3, which will not be repeated herein for the sake of simplicity.

Figure 7:
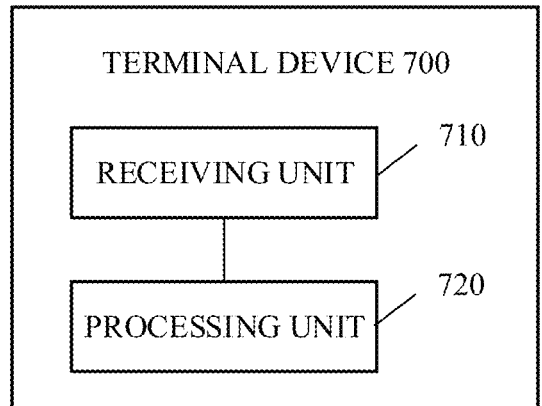
FIG. 7 is a schematic block diagram of a terminal device according to other implementations.

FIG. 7 is a schematic block diagram of a terminal device 700 according to other implementations. As illustrated in FIG. 7, the terminal device 700 includes a receiving unit 710 and a processing unit 720. The receiving unit 710 is configured to receive first indication information. The processing unit 720 is configured to perform at least one of the following. The processing unit 720 is configured to determine, according to the first indication information, whether the terminal device is allowed to access a cell, when the receiving unit receives the first indication information, where the terminal device is an IoT-type device. The processing unit 720 is configured to determine, according to second indication information, whether the terminal device is allowed to access the cell, when the receiving unit fails to receive the first indication information, where the second indication information is further indicative of whether a non-IoT-type device is allowed to access the cell.

Therefore, a network device indicates, through indication information transmitted, whether the IoT-type device is allowed to access the cell. The terminal device determines, according to the indication information received from the network device, whether the terminal device can access the cell, which is possible to achieve efficient control of cell access of the IoT-type device, thereby avoiding the IoT-type device and the non-IoT-type device from affecting each other.

In some implementations, the first indication information and the second indication information are carried in the same information block or carried in different information blocks.

In some implementations, the first indication information is carried in an MIB or an SIB.

In some implementations, the first indication information occupies 1 bit, and a value of the bit is indicative of whether the IoT-type device is allowed to access the cell.

It should be understood that, the terminal device 700 can implement the operations performed by the terminal device in the method illustrated in FIG. 5, which will not be repeated herein for the sake of simplicity.

Figure 8:
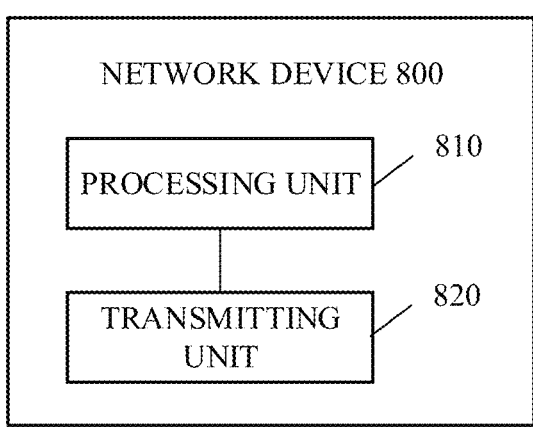
FIG. 8 is a schematic block diagram of a network device according to implementations.

FIG. 8 is a schematic block diagram of a network device 800 according to implementations. As illustrated in FIG. 8, the network device 800 includes a processing unit 810 and a transmitting unit 820. The processing unit 810 is configured to generate first indication information, where the first indication information is indicative of whether an IoT-type device is allowed to access a cell. The transmitting unit 820 is configured to transmit the first indication information generated by the processing unit 810.

Therefore, the network device indicates, through indication information transmitted, whether the IoT-type device is allowed to access the cell. A terminal device determines, according to the indication information received from the network device, whether the terminal device can access the cell, which is possible to achieve efficient control of cell access of the IoT-type device, thereby avoiding the IoT-type device and a non-IoT-type device from affecting each other.

In some implementations, the transmitting unit 820 is further configured to transmit second indication information, where the second indication information is indicative of whether the non-IoT-type device is allowed to access the cell.

In some implementations, the first indication information and the second indication information are carried in the same information block or carried in different information blocks.

In some implementations, the first indication information is carried in an MIB or an SIB.

In some implementations, the first indication information occupies 1 bit, and a value of the bit is indicative of whether the IoT-type device is allowed to access the cell.

It should be understood that, the network device 800 can implement the operations performed by the network device in the method illustrated in FIG. 3, which will not be repeated herein for the sake of simplicity.

Figure 9:
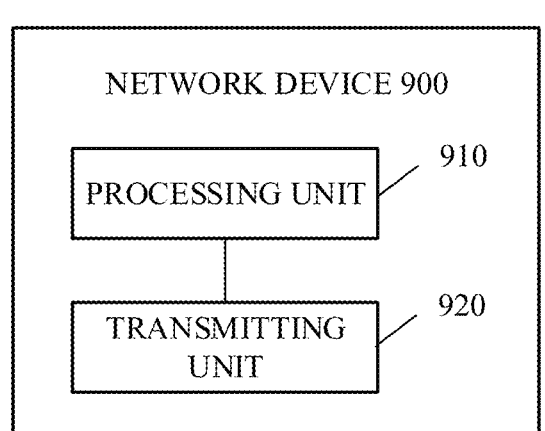
FIG. 9 is a schematic block diagram of a network device according to other implementations.

FIG. 9 is a schematic block diagram of a network device 900 according to other implementations. As illustrated in FIG. 9, the network device 900 includes a processing unit 910 and a transmitting unit 920. The processing unit 910 is configured to generate indication information. The indication information includes first indication information and second indication information, where the first indication information is indicative of whether an IoT-type device is allowed to access a cell, and the second indication information is indicative of whether a non-IoT-type device is allowed to access the cell. Alternatively, the indication information includes the second indication information without including the first indication information, where the second indication information is further indicative of whether the IoT-type device is allowed to access the cell. The transmitting unit 920 is configured to transmit the indication information generated by the processing unit 910.

Therefore, the network device indicates, through the indication information transmitted, whether the IoT-type device is allowed to access the cell. A terminal device determines, according to the indication information received from the network device, whether the terminal device can access the cell, which is possible to achieve efficient control of cell access of the IoT-type device, thereby avoiding the IoT-type device and the non-IoT-type device from affecting each other.

In some implementations, the first indication information and the second indication information are carried in the same information block or carried in different information blocks.

In some implementations, the first indication information is carried in an MIB or an SIB.

In some implementations, the first indication information occupies 1 bit, and a value of the bit is indicative of whether the IoT-type device is allowed to access the cell.

It should be understood that, the network device 900 can implement the operations performed by the network device in the method illustrated in FIG. 5, which will not be repeated herein for the sake of simplicity.

Figure 10:
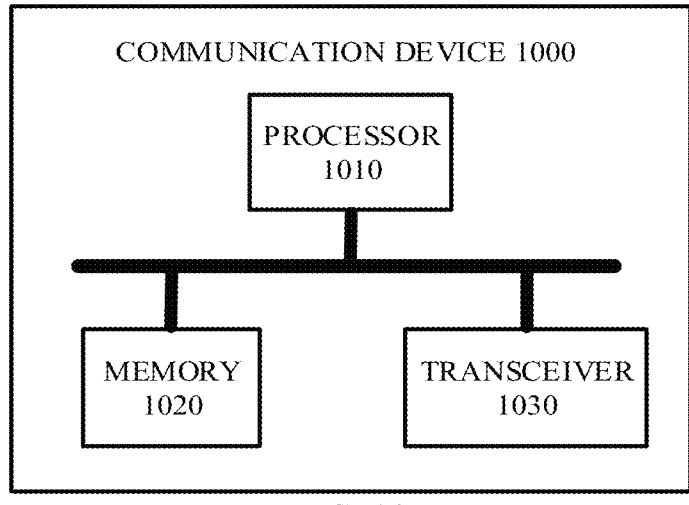
FIG. 10 is a schematic structural diagram of a communication device according to implementations.

FIG. 10 is a schematic structural diagram of a communication device 1000 according to implementations. As illustrated in FIG. 10, the communication device 1000 includes a processor 1010. The processor 1010 can invoke and execute computer programs stored in a memory to perform the method provided in implementations.

As illustrated in FIG. 10, the communication device 1000 can further include the memory 1020. The processor 1010 can invoke and execute the computer programs stored in the memory 1020 to perform the method provided in implementations.

The memory 1020 may be a separate device independent of the processor 1010, or may be integrated into the processor 1010.

As illustrated in FIG. 10, the communication device 1000 can further include a transceiver 1030. The processor 1010 can control the transceiver 1030 to communicate with other devices, for example, to send information or data to other devices, or to receive information or data from other devices.

The transceiver 1030 may include a transmitter and a receiver. The transceiver 1030 may further include an antenna, where one or more antennas can be provided.

The communication device 1000 may be operable as the terminal device of implementations, and the communication device 1000 can implement the operations performed by the terminal device described in the foregoing method implementations, which will not be repeated herein for the sake of simplicity.

Alternatively, the communication device 1000 may be operable as the network device of implementations, and the communication device 1000 can implement the operations performed by the network device described in the foregoing method implementations, which will not be repeated herein for the sake of simplicity.

Figure 11:
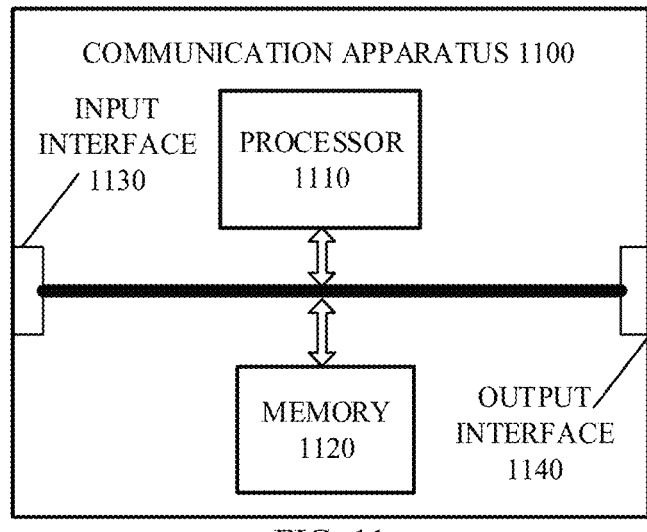
FIG. 11 is a schematic structural diagram of a communication apparatus according to implementations.

FIG. 11 is a schematic structural diagram of a communication apparatus according to implementations. As illustrated in FIG. 11, the apparatus 1100 includes a processor 1110. The processor 1110 is configured to invoke and execute computer programs stored in a memory to perform the method provided in implementations.

As illustrated in FIG. 11, the apparatus 1100 further includes the memory 1120. The processor 1110 can invoke and execute the computer programs stored in the memory 1120 to perform the method provided in implementations.

The memory 1120 may be a separate device independent of the processor 1110, or may be integrated into the processor 1110.

The apparatus 1100 may further include an input interface 1130. The processor 1110 can control the input interface 1130 to communicate with other devices or chips, for example, to acquire information or data sent by other devices or chips.

The apparatus 1100 may further include an output interface 1140. The processor 1110 can control the output interface 1140 to communicate with other devices or chips, for example, to output information or data to other devices or chips.

The apparatus 1100 is applicable to the network device of implementations. The communication apparatus can implement the operations performed by the network device described in the foregoing method implementations, which will not be repeated herein for the sake of simplicity.

Alternatively, the apparatus 1100 is applicable to the terminal device of implementations. The communication apparatus can implement the operations performed by the terminal device described in the foregoing method implementations, which will not be repeated herein for the sake of simplicity.

It should be understood that, the apparatus 1100 may be a chip. The chip herein may also be referred to as a system-on-chip (SOC).

It should be understood that, the processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory according to implementations may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

The above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 12:
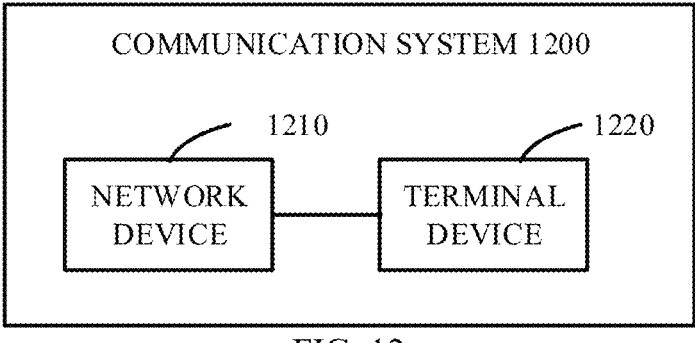
FIG. 12 is a schematic block diagram of a communication system according to implementations.

FIG. 12 is a schematic block diagram of a communication system 1200 according to implementations. As illustrated in FIG. 12, the communication system 1200 includes a network device 1210 and a terminal device 1220. The network device 1210 is configured to transmit first indication information, where the first indication information is indicative of whether an IoT-type device is allowed to access a cell. The terminal device 1220 is configured to obtain the first indication information, and determine, according to the first indication information, whether the terminal device allowed to access the cell.

The network device 1210 can implement functions in the method illustrated in FIG. 3 which are implemented by the network device. The network device 1210 may be structured like the network device 800 illustrated in FIG. 8, which will not be repeated herein for the sake of simplicity.

The terminal device 1220 can implement functions in the method illustrated in FIG. 3 which are implemented by the terminal device. The terminal device 1220 may be structured like the terminal device 600 illustrated in FIG. 6, which will not be repeated herein for the sake of simplicity.

Figure 13:
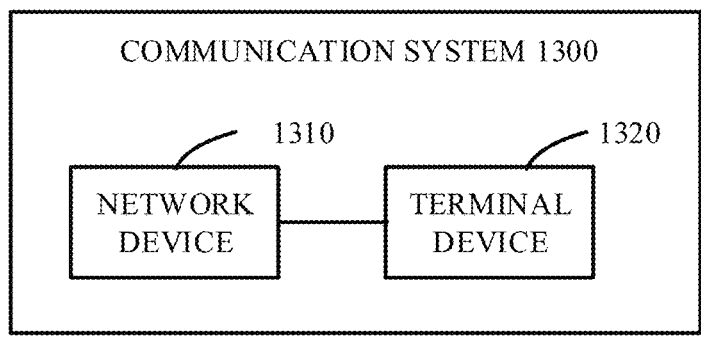
FIG. 13 is a schematic block diagram of a communication system according to other implementations.

FIG. 13 is a schematic block diagram of a communication system 1300 according to implementations. As illustrated in FIG. 13, the communication system 1300 includes a network device 1310 and a terminal device 1320. The network device 1310 is configured to transmit indication information. The indication information includes first indication information and second indication information, where the first indication information is indicative of whether an IoT-type device is allowed to access a cell, and the second indication information is indicative of whether a non-IoT-type device is allowed to access the cell. Alternatively, the indication information includes the second indication information without including the first indication information, where the second indication information is further indicative of whether the IoT-type device is allowed to access the cell. The terminal device 1320 is configured to perform at least one of the following. The terminal device 1320 is configured to determine, according to the first indication information, whether the terminal device is allowed to access the cell, when the terminal device 1320 obtains the first indication information. The terminal device 1320 is configured to determine, according to the second indication information, whether the terminal device is allowed to access the cell, when the terminal device 1320 fails to obtain the first indication information.

The network device 1310 can implement functions in the method illustrated in FIG. 5 which are implemented by the network device. The network device 1310 may be structured like the network device 900 illustrated in FIG. 9, which will not be repeated herein for the sake of simplicity.

The terminal device 1320 can implement functions in the method illustrated in FIG. 5 which are implemented by the terminal device. The terminal device 1320 may be structured like the terminal device 700 illustrated in FIG. 7, which will not be repeated herein for the sake of simplicity.

Implementations further provide a computer readable storage medium. The computer readable storage medium is configured to store computer programs. The computer readable storage medium is applicable to the terminal device of implementations. The computer programs, when executed, are operable with a computer to implement the operations performed by the terminal device described in the foregoing method implementations, which will not be repeated herein for the sake of simplicity. Alternatively, the computer readable storage medium is applicable to the network device of implementations. The computer programs, when executed, are operable with a computer to implement the operations performed by the network device described in the foregoing method implementations, which will not be repeated herein for the sake of simplicity.

Implementations further provide a computer program product. The computer program product includes computer program instructions. The computer program product is applicable to the terminal device of implementations. The computer program instructions, when executed, are operable with a computer to implement the operations performed by the terminal device described in the foregoing method implementations, which will not be repeated herein for the sake of simplicity. Alternatively, the computer program product is applicable to the network device of implementations. The computer program instructions, when executed, are operable with a computer to implement the operations performed by the network device described in the foregoing method implementations, which will not be repeated herein for the sake of simplicity.

Implementations further provide a computer program. The computer program is applicable to the terminal device of implementations. The computer program, when executed by a computer, is operable with the computer to implement the operations performed by the terminal device described in the foregoing method implementations, which will not be repeated herein for the sake of simplicity. Alternatively, the computer program is applicable to the network device of implementations. The computer program, when executed by a computer, is operable with the computer to implement the operations performed by the network device described in the foregoing method implementations, which will not be repeated herein for the sake of simplicity.

The terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In implementations herein, "B corresponding to A" means that B is associated with A, and B can be determined according to A. However, "B is determined according to A" does not mean that B is determined according to A only, and B may also be determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for cell access, comprising:

obtaining, by a terminal device, first indication information and second indication information from a network device, the first indication information being indicative of whether an internet of things-type (IoT-type) device is allowed to access a cell, the second indication information being indicative of whether a non-IoT-type device is allowed to access the cell;

determining, by the terminal device, a type of the terminal device, wherein the type of the terminal device is one of IoT-type and non-IoT type;

determining, by the terminal device, according to the first indication information whether the terminal device is allowed to access the cell, when the type of the terminal device is the IoT-type device, and determining, by the terminal device, according to the second indication information, whether the terminal device is allowed to access the cell, when the type of the terminal device is non-IoT type;

wherein the first indication information is carried in a system information block (SIB) and the second indication information is carried in a master information block (MIB).

2. The method of claim 1, wherein the first indication information and the second indication information are carried in different information blocks.

3. The method of claim 1, wherein the first indication information occupies 1 bit, and a value of the bit is indicative of whether the IoT-type device is allowed to access the cell.

4. The method of claim 1, wherein the terminal device is an IoT-type device, and determining, by the terminal device, according to the first indication information or the second indication information, whether the terminal device is allowed to access the cell comprises:

determining that the terminal device is allowed to access the cell when the first indication information indicates that the IoT-type device is allowed to access the cell.

5. A method for cell access, comprising:

transmitting, by a network device, first indication information, wherein the first indication information is indicative of whether an internet of things-type (IoT-type) device is allowed to access a cell; and transmitting, by the network device, second indication information, wherein the second indication information is indicative of whether a non-IoT-type device is allowed to access the cell;

wherein the first indication information is carried in a system information block (SIB) and the second indication information is carried in a master information block (MIB).

6. The method of claim 5, wherein the first indication information occupies 1 bit, and a value of the bit is indicative of whether the IoT-type device is allowed to access the cell.

7. A terminal device, comprising:

a transceiver;

a processor; and a memory configured to store computer programs which, when executed by the processor, are operable with the processor to:

cause the transceiver to receive first indication information and second indication information from a network device, the first indication information being indicative of whether an internet of things-type (IoT-type) IoT-type device is allowed to access a cell, the second indication information being indicative whether a non-IoT-type device is allowed to access the cell;

determine a type of the terminal device, wherein the type of the terminal device is one of IoT-type and non-IoT type; and determine, according to the first indication information, whether the terminal device is allowed to access the cell, when the type of the terminal device is the IoT-type device, and determine, according to the second indication information, whether the terminal device is allowed to access the cell, when the type of the terminal device is non-IoT type;

wherein the first indication information is carried in a system information block (SIB) and the second indication information is carried in a master information block (MIB).

8. The terminal device of claim 7, wherein the first indication information and the second indication information are carried in different information blocks.

9. The terminal device of claim 7, wherein the first indication information occupies 1 bit, and a value of the bit is indicative of whether the IoT-type device is allowed to access the cell.

* * * * *